United States Patent
Van Berlo et al.

(10) Patent No.: US 9,212,009 B2
(45) Date of Patent: Dec. 15, 2015

(54) LAMINATED BOARD

(75) Inventors: Patrick Petrus Antonius Maria Van Berlo, Hamilton (NZ); Jason Paul Rogers, Hamilton (NZ)

(73) Assignee: Corcel IP Limited, Hamilton (NZ)

(*) Notice: Subject to any disclaimer, the term of this patent is extended or adjusted under 35 U.S.C. 154(b) by 126 days.

(21) Appl. No.: 13/982,968

(22) PCT Filed: Feb. 1, 2012

(86) PCT No.: PCT/NZ2012/000008
§ 371 (c)(1),
(2), (4) Date: Oct. 14, 2013

(87) PCT Pub. No.: WO2012/105855
PCT Pub. Date: Aug. 9, 2012

(65) Prior Publication Data
US 2014/0027243 A1    Jan. 30, 2014

(30) Foreign Application Priority Data
Feb. 1, 2011  (NZ) ........................................ 590847

(51) Int. Cl.
*B65G 47/24* (2006.01)
*B65G 47/31* (2006.01)
*B65G 47/252* (2006.01)

(52) U.S. Cl.
CPC ................ *B65G 47/31* (2013.01); *B65G 47/24* (2013.01); *B65G 47/252* (2013.01)

(58) Field of Classification Search
CPC ... B65G 47/24; B65G 47/2445; B65G 47/252
See application file for complete search history.

(56) References Cited

U.S. PATENT DOCUMENTS

| | | | | |
|---|---|---|---|---|
| 3,684,073 | A | 8/1972 | Giles | |
| 3,722,657 | A * | 3/1973 | Kienle et al. | 198/394 |
| 3,887,066 | A * | 6/1975 | Houtsager | 198/403 |
| 3,918,561 | A * | 11/1975 | Isacsson | 193/35 A |
| 4,003,463 | A * | 1/1977 | Holt et al. | 198/374 |
| 4,359,304 | A * | 11/1982 | Trudeau | 414/798.9 |
| 4,484,675 | A * | 11/1984 | Doherty et al. | 198/413 |
| 4,662,511 | A | 5/1987 | Greener | |
| 4,720,006 | A * | 1/1988 | Lenherr | 198/415 |
| 4,881,635 | A * | 11/1989 | Raschke | 198/460.2 |
| 5,092,444 | A * | 3/1992 | Agnoff | 193/2 D |
| 5,482,140 | A * | 1/1996 | Moore | 198/403 |
| 5,567,103 | A * | 10/1996 | Konstant | 414/276 |
| 5,605,216 | A * | 2/1997 | Raybon et al. | 198/395 |
| 5,660,262 | A * | 8/1997 | Landrum et al. | 198/411 |
| 5,725,723 | A * | 3/1998 | Cusick et al. | 156/502 |

(Continued)

*Primary Examiner* — Gene Crawford
*Assistant Examiner* — Thomas Randazzo
(74) *Attorney, Agent, or Firm* — Greer, Burns & Crain, Ltd.

(57) ABSTRACT

A conveyor system for re-orienting strips of laminated corrugated board which includes:
  a first conveyor assembly; and
  a second conveyor assembly,
wherein the first conveyor assembly conveys a plurality of adjacent strips having an upright orientation to the second conveyor assembly;
wherein the second conveyor assembly includes a conveyor belt configured to convey the plurality of adjacent strips at a faster speed to that at which the strips are delivered to the second conveyor assembly by the first conveyor assembly; and
wherein the acceleration of each strip upon contacting the second conveyor assembly causes that strip to move away from the adjacent strip and tip over from the upright orientation to a flat orientation.

11 Claims, 4 Drawing Sheets

(56) References Cited

U.S. PATENT DOCUMENTS

| | | | |
|---|---|---|---|
| 6,782,991 B2* | 8/2004 | Johansson | 198/401 |
| 7,921,981 B2* | 4/2011 | Bastasch et al. | 198/390 |
| 2004/0050659 A1* | 3/2004 | Jensen et al. | 198/395 |
| 2004/0168887 A1* | 9/2004 | Franzaroli | 198/395 |
| 2005/0072656 A1* | 4/2005 | Costanzo | 198/779 |
| 2005/0135917 A1* | 6/2005 | Kauppila et al. | 414/758 |
| 2008/0023294 A1* | 1/2008 | Moore et al. | 198/370.02 |
| 2009/0145556 A1* | 6/2009 | Schell | 156/472 |
| 2011/0244259 A1 | 10/2011 | Van Berlo | |

* cited by examiner

LAMINATED BOARD

TECHNICAL FIELD

The present specification details a disclosure which relates to improvements in and relating to laminated board.

In particular, the specification details as part of the invention a system and method of producing closed cell core board from corrugated paperboard. However, the present invention can also be used for producing other laminated products made of other types of sheet material which includes a core or layer comprising strips of material.

BACKGROUND

In the manufacture of high strength closed cell coreboard such as 3C™ board by Corcel it is necessary to alter the orientation of laminated strips of board from an upright orientation to a flat/horizontal orientation.

The strips are formed by cutting laminated corrugated board (formed from around usually 3-5 layers of single face or double face corrugated paperboard) into strips having a width of generally around 5-10 mm. The strips once cut have an upright orientation (wherein the flute channels extend horizontally) however the strips need to be tipped over in order to have a horizontal (flat) orientation (wherein the flute channels extend vertically) so the strips can form the core of the closed cell coreboard.

Devices for tipping the laminated strips are known—refer for example US 2009/0145556. This specification describes a turning roller wherein each strip to be reoriented becomes located within an accommodation means. Rotation of the roller alters the orientation of the strip and at which point the strip is then removed from the roller by a stripping plate. However, this method of reorienting or turning the strips is a relatively slow process. Each strip needs to become located on the turning roller which in turn needs to rotate a certain amount before the next strip can be picked up by the roller for reorientation. Thus, the speed of delivery of the strips to the turning roller needs to be controlled. If the strips are delivered too fast strips downstream will push on adjacent upstream strips and may be forced to ride up over their upstream counterpart. A further disadvantage with this type of tipping station is that the strips can get crushed by the roller if they have thickness of around 5.8 mm or less.

It is desirable to address the foregoing problems or at least to provide the public with a useful choice.

Further aspects and advantages of the present invention will become apparent from the ensuing description which is given by way of example only.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

SUMMARY

The present specification discloses an apparatus and method for re-orienting (tipping) strips from an upright to a flat orientation. The strips are initially in an upright orientation and are adjacently abutted alongside one another in a block like formation having just been cut from a single piece of material. The strips in this block however are required to be tipped over to a flat orientation where each strip is positioned beside one another in a single horizontal plane. In effecting a re-orientation of the strips the weight of a strip to be re-oriented has been found to be a factor which needs to be taken into account. Once the strips have been re-oriented they are then ready to undergo gluing and then bonding to sheet material to form laminated board. The specification discloses a novel coreboard having a reduced thickness which can be.

Definitions

The term 'dense strip' as used herein refers to a strip made of a construction and/or material(s) which give the strip sufficient weight and/or thickness to be re-oriented by an increase in acceleration alone.

The term 'non-dense strip' as used herein refers to a strip made of a construction and/or material(s) which do not provide sufficient weight and/or thickness to be re-oriented by an increase in acceleration without an additional force being applied.

It will be appreciated by those skilled in the art that in some cases determining whether a strip is a dense strip or a non-dense strip may require a small degree of experimentation. For example increasing the frictional coefficient of the conveyor belt may alter whether something is considered to be a dense or non-dense strip.

Re-Orientation System for Dense Strips

A conveyor system for re-orienting strips of laminated corrugated board which includes:

a first conveyor assembly; and a second conveyor assembly, wherein the first conveyor assembly conveys a plurality of adjacent strips having an upright orientation to the second conveyor assembly;

wherein the second conveyor assembly includes a conveyor belt configured to convey the plurality of adjacent strips at a faster speed to that at which the strips are delivered to the second conveyor assembly by the first conveyor assembly; and wherein the acceleration of each strip upon contacting the second conveyor assembly causes that strip to move away from the adjacent strip and tip over from the upright orientation to a flat orientation.

Several embodiments of the invention and advantages it provides will be further described in more detail below.

The inventor has found that this particular embodiment of the system is suited to strips which have sufficient mass so that each strip can:

immediately experience the accelerative force of the conveyor belt once placed on the second conveyor assembly; and accelerate away from an adjacent downstream strip which is about to be transferred onto the second conveyor assembly.

In some preferred embodiments the top surface of the strips may be pre-glued having a layer of adhesive applied thereto prior to being presented to the first conveyor assembly. This is ideal when the strips will form the core of a substantially planar sheet material as this enables the strips to be glued to one another giving enhanced structural integrity of the resulting laminated board.

In some embodiments the top surface of the strips may not be pre-glued which is particularly for embodiments where the strips are only bonded to a single sheet of material and a greater degree of flexibility of the resulting laminate is required which is obtained when the strips are not glued to one another.

The inventor has found that when the strip is relatively lightweight (non-dense) and weighs around 6 g-12 g or less the layer of glue on the upright strips combined with the lack of weight of the strip (i.e. downward force exerted) on the second conveyor belt can lead to 2 or more strips being simultaneously moved onto the second conveyor and prevents the strips from being laid flat side by side. Instead these two strips are partially on top of one another. This occurs as the weight of the strip is insufficient to frictionally engage the conveyor belt which slips underneath the strip and fails to accelerate the strip.

Re-Orientation System for Dense or Non-Dense Strips

A conveyor system for re-orienting strips of laminated corrugated board which includes:

a first conveyor assembly; and a second conveyor assembly, wherein the first conveyor assembly conveys a plurality of strips having an upright orientation to the second conveyor assembly;

wherein the conveyor system also includes a speed retarding element which decreases the speed of the top of a strip as the strip starts moves along the second conveyor assembly;

wherein the second conveyor assembly includes a conveyor belt configured to convey the plurality of strips at a faster speed to that at which the strips are delivered to the second conveyor assembly by the first conveyor assembly; and wherein the acceleration of each strip upon contacting the second conveyor assembly together with the action of the retarding element causes that strip to tip over from the upright orientation to a flat orientation.

One function of the speed retarding element in some preferred embodiments is that it also facilitates frictional engagement between the second conveyor with the bottom of the strip, to accelerate the bottom of the strip, and pull the strip away from frictional engagement with an adjacent strip.

In certain preferred embodiments the top surface of the strips again have a layer of adhesive applied thereto prior to being presented to the first conveyor assembly for the reasons mentioned above.

Similarly certain preferred embodiments may not have the surface of the strips glued again for the reasons mentioned above.

Method

A method of re-orienting a plurality of strips from an upright to a flat orientation characterised by the step of using a sudden increase in speed to effect a tipping over of the strips from an upright orientation to a flat orientation.

A method of re-orienting a plurality of strips from an upright to a flat orientation characterised by the step of creating a speed differential between the top and bottom portions of a strip to tip the strip over.

A method of re-orienting a plurality of strips travelling at an initial speed so the strips move from an upright orientation to a flat orientation the method characterised by the steps of:

a) suddenly increasing the speed to a bottom portion of strip; and b) retarding the speed of the top section of the strip, to effect a tipping over of the strips from the upright orientation to a laid flat orientation.

A Laminated Timber Board

A laminated wood board which is formed with at least two planar facing sheets sandwiching there between at least one core comprising a plurality of wood strips wherein:

the direction of the grain of said wood strips is orthogonal; and the plane of said strips is parallel, to the plane of the facing sheets.

A laminated wood board which is manufactured by implementing a method substantially as described herein.

The wood strips may be formed from laminated sheet material which is cut into strips. The wood strips initially have the laminated layers and the grain horizontally oriented. After being tipped to a flat orientation the layers and grain are vertically oriented.

Method of Making Closed Cell Coreboard

A method of making closed cell coreboard characterised by the step re-orienting strips of laminated single face or double face paperboard according to a method substantially as described herein and then sandwiching the core between liner sheets on either side thereof.

An advantage of this method of manufacture is it enables closed cell coreboard to be manufactured from strips of laminated single face or double face paperboard having a thickness of substantially between 3.5 mm to 4.5 mm.

Box

According to a further aspect of the present invention there is provided a box which is manufactured from closed cell coreboard having a core comprising strips of laminated single face or double face paperboard which have been re-oriented according to a method substantially as described herein.

Preferably, the box is manufactured from strips of laminated single face or double face paperboard which have a core having a thickness of substantially between 3.5 mm to 4.5 mm.

According to a further aspect of the present invention there is provided a box which is manufactured from closed cell coreboard substantially as described above wherein the box includes at least one ventilation channel created by at least one wall being configured to provide a fluid conduit extending from the base of the wall to the top of the wall.

A blank for a box substantially as described above.

Coreboard

A closed cell coreboard made from paperboard which has a core thickness of substantially between 3.5 to 4.5 mm manufactured in accordance with a method substantially as described herein.

DETAILED DESCRIPTION

Figure 2:
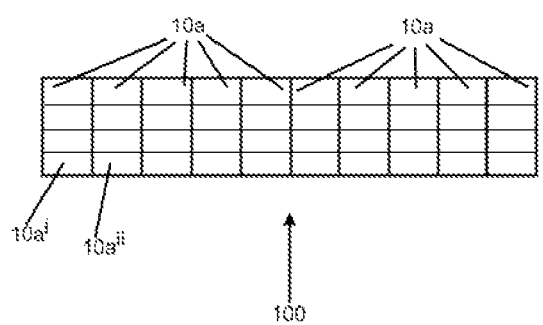
FIG. 2 shows a schematic view of a block of adjacent strips made of laminated layers of single face paperboard.

In relation to the figures there is shown a strip re-orienting station (the station) 1. The station 1 has a delivery conveyor assembly 2 having a conveyor belt 3 which receives, from another conveyor system (not shown), a block 100 of upright strips 10a of laminated corrugated Kraft paper board (see also FIG. 2). The block of strips 100 was made by cutting 4 ply laminated corrugated single face paper board into strips 10a.

Figure 3:
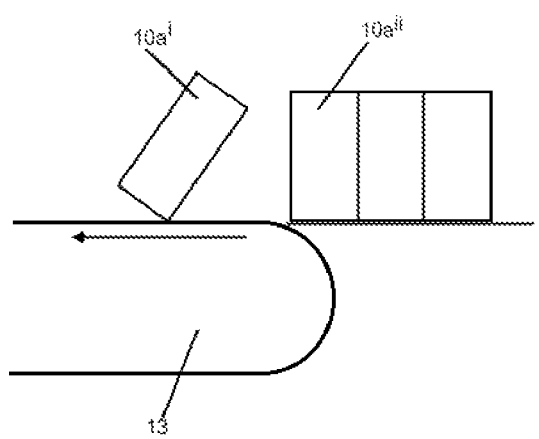
FIG. 3 shows a schematic view of the second conveyor causing a strip to tip over.
Figure 4:
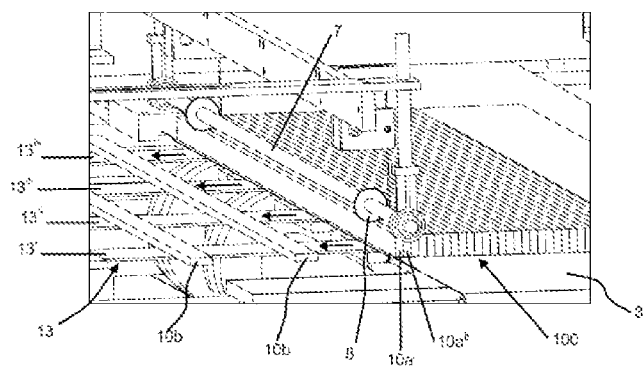
FIG. 4 shows a close up schematic perspective view of the station shown in FIG. 1.

The strips 10a have each had their top edge pre-glued at an earlier station (not shown). The pre-glued strips 10a are conveyed in direction A by conveyor belt 3 until the strips 10a contact a stop (not shown) but consisting of a metal strip positioned along line 4. The strips 10a are then pushed in direction B by a first conveyor assembly in the form of a pusher bar 5 and associated ram 10005 this moves the block of strips 100 towards the second conveyor assembly 6 until the strips 10a are eventually all transferred onto the second conveyor assembly 6. The second conveyor assembly 6 has a conveyor belt 13 (formed from four spaced apart synchrously driven endless belts $13^i$-$13^{iv}$). The conveyor belt 13 travels in direction C at speed of either around 4-10 times the speed of the pusher bar 5 (or other increased speed relative to the first conveyor which is sufficient to create a separation between adjacent strips) so there is a gap therebetween allowing the leading strip to tip over (see FIG. 3) that at which the pusher bar 5 conveys the strips 10a to the second conveyor assembly 6.

The station 1 also has a speed retarding element in the form of an axle 7 and gear wheels 8. The wheels 8 are connected to the axle 7 so as to rotate therewith. Preferably, the gear wheels 8 are made of spring steel having a thickness of 0.15 mm to avoid glue build up thereon from the top edge of the strips.

Figure 1:
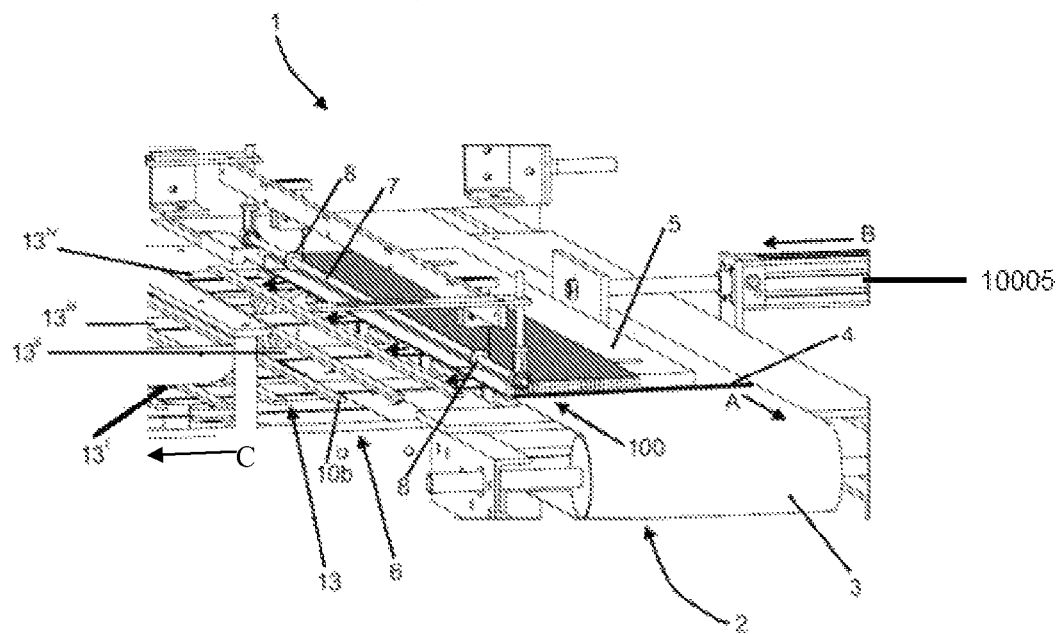
FIG. 1 shows a partial perspective view of strip re-orienting and gluing station forming part of an automated corrugated paper producing plant in accordance with one preferred embodiment of the present invention.

As a leading strip $10a^i$ of the block of strips 100 is passed onto the conveyor belt 13, gear wheels 8 contact the top of strip $10a^i$ and apply a downward force which imparts a frictional drag to the top of the strip $10a^i$. Additionally, the downward force ensures the strip $10a^i$ (which is lightweight (non-dense) paperboard weighing around 6 g) frictionally engages with the surface of the conveyor belt 13 to become accelerated by the conveyor belt 13. The acceleration of the bottom of the strip together with the drag experienced by the top of the strip act in combination to cause the leading upright strip $10a^i$ from the block of strips 100 passing onto the conveyor belt 13 to fall over to become a flat strip 10b (refer FIGS. 3 and 1). Then the next strip $10a^{ii}$ in the block 100 undergoes this tipping process which is repeated until all the strips are passed on to the conveyor belt 13.

The flat strips 10b on conveyor belt 13 are fed to a laminating station (not shown) where they are laminated to planar sheet material.

The inventor has found with lightweight strips unless a downward force is applied then the strips do not have sufficient frictional engagement with the conveyor belt 13 to experience the acceleration. As a result the conveyor belt 13 tends to slip underneath the leading upright strip $10a^i$ without affecting the speed of strip $10a^i$ until after the adjacent strip $10a^{ii}$ has also been transferred onto the conveyor belt 13. This results in strip $10a^i$ resting partially upon $10a^{ii}$ which is not suitable for core formation, as the strips 10b need to be in a single plane. A further compounding factor is the fact due to the force imparted by pusher bar 5 strips $10a^i$ and $10a^{ii}$ are frictionally connected to one another and thus the speed of conveyor 2 should be sufficient to overcome this frictional engagement between strips $10a^i$ and $10a^{ii}$.

Figure 5:
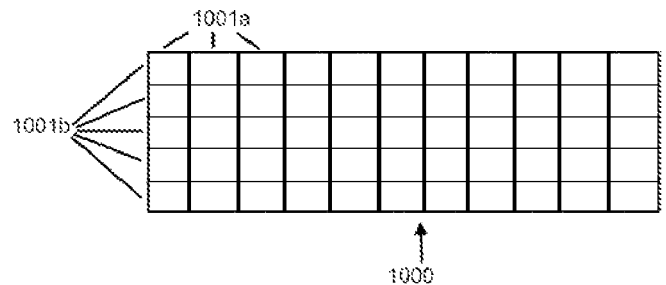
FIG. 5 shows a schematic view of a block of adjacent strips of laminated plywood.
Figure 6:
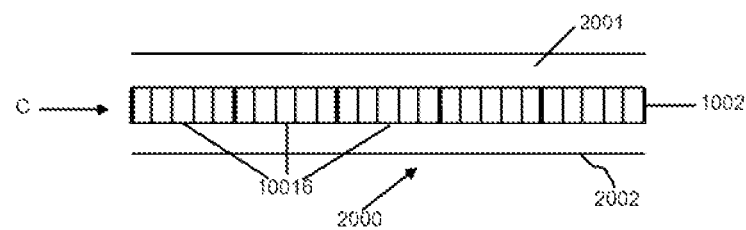
FIG. 6 shows a laminated timber board in accordance with a further preferred embodiment of the present invention.
Figure 7:
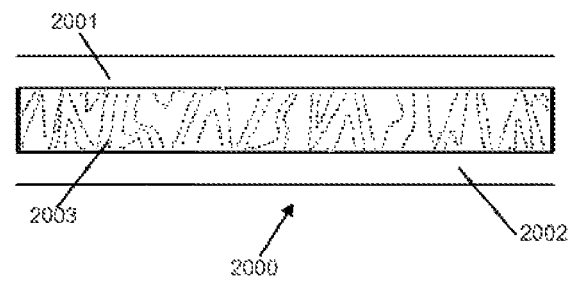
FIG. 7 shows a laminated timber board as shown in FIG. 6 looking along line C.

FIGS. 5-7 show how a laminated timber board manufactured in accordance with the principles of the present invention in a manner similar to that described in relation to FIGS. 1-4. FIG. 5 shows a block 1000 of strips 1001a formed from laminated layers 1001b of plywood. The strips 1001a are tipped over and used to form a core 1002 of a laminated timber board 2000 which has plywood facing sheets 2001 and 2002 bonded to the top and bottom surfaces of core 1002 (refer FIGS. 6 and 7).

Figure 8:
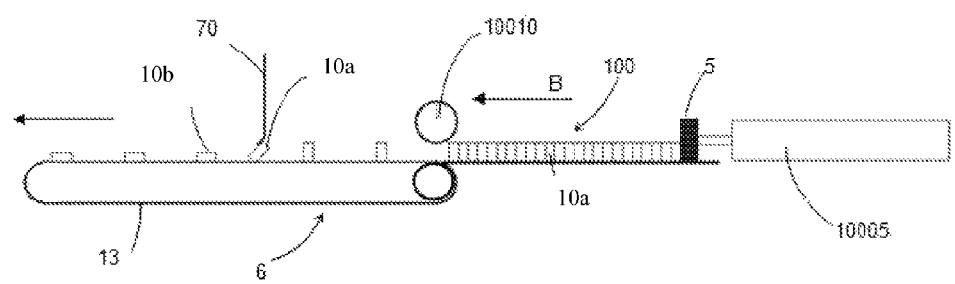
FIG. 8 shows a side view of a strip re-orienting station in accordance with a further preferred embodiment of the present invention.

FIG. 8 shows an alternative strip re-orienting station (the station) 10000 which can re-orient both dense and non-dense strips. For ease of reference like reference numerals have been used to describe like elements already described in relation to FIG. 1. The station 10000 is processing a block 100 of upright strips 10a of laminated corrugated Kraft paper board (see also FIG. 2). The block of strips 100 was made by cutting 4 ply laminated corrugated single face paper board into strips 10a.

The strips 10a are pushed in direction B by a first conveyor assembly in the form of a pusher bar 5 connected to a ram 10005 this moves the block of strips 100 towards the second conveyor assembly 6 until the strips 10a are eventually all transferred onto the second conveyor assembly 6. The second conveyor assembly 6 has a conveyor belt 13. The conveyor belt 13 travels in direction C at speed of either around 4-10 times the speed of the pusher bar 5. Similarly, a driven roller 10010 which pushes down on the strips 10a travels at the same speed as the belt 13 and contacts the top of the strips 10a as they pass onto belt 13 to create a separation between adjacent strips so there is a gap therebetween.

The station 1 also has a speed retarding element in the form of a plurality of flexible fingers 70 which are spaced apart to span across belt 13.

The strips 10a once separated travel along with the belt 13 until the top edge portion of a strip 10a contacts the flexible fingers 70 which then initiates tipping of the strip a process which is repeated until all the strips are passed on to the conveyor belt 13. The strips 10a once they have been tipped to a flat orientation 10b are then collected by a stop so they glued leading edges (formerly the top edge) can contact upstream strips to become bonded thereto.

The flat strips 10b on conveyor belt 13 are then fed to a laminating station (not shown) where they are laminated to planar liner sheet material.

Figure 9:
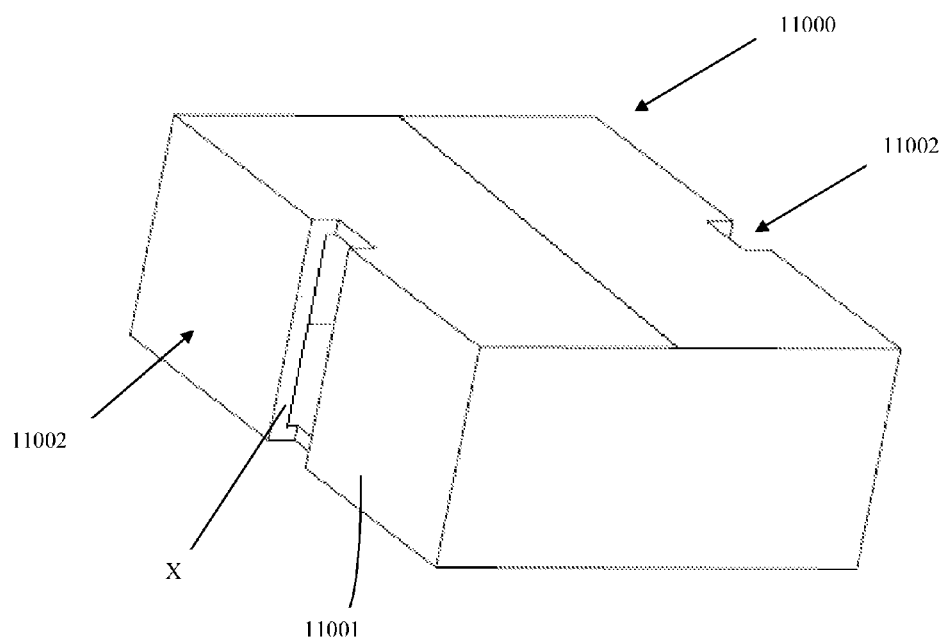
FIG. 9 shows a ventilated box manufactured from coreboard using the methods and principles of the invention disclosed herein and having a core thickness of substantially 3.5 mm.

FIG. 9 shows a ventilated box 11000. The box has opposed side walls 11001 (of which only one is shown) which have a ventilation channel 11002 therein. The VC is formed by cutting out a portion of the side wall and a portion of the top of the box 11003 and the base of the box 11003. The box is manufactured with coreboard formed in accordance with the present invention so that core has a thickness of 3.5 mm see arrow X.

A big advantage of the invention disclosed herein is it allows for an automated process for producing coreboard at greater manufacturing speeds and thinner thicknesses than was previously possible.

Discussion of Various Non-Limiting Ways to Implement the Present Invention

The first conveyor assembly may be configured in any number of different ways.

The first conveyor assembly may in some preferred embodiments include a conveyor belt.

In alternative preferred embodiments the first conveyor assembly may alternatively include a pusher bar.

In still further preferred embodiments the first conveyor assembly may include both a conveyor belt and a pusher bar.

The speed retarding element may come in a variety of forms.

In one preferred embodiment the speed retarding element may include an axle and two wheels located at respect end portions of the axle. The wheels may be connected to the axle so as to rotate therewith. Preferably, in embodiments where the strips are pre-glued, the wheels may be in the form of gear wheels as less glue has been found to be transferred to toothed wheels than a standard wheel. In particular, a gear wheel having a thickness of around 0.15 mm has been found to further reduce the amount of glue transferred from the top of the strips to the wheel.

The speed retarding element may be in the form of at least one directed jet of fluid. In one preferred embodiment the fluid may be air.

In a still further preferred embodiment the speed retarding element may be one or more resilient fingers which restrict the path of the top portion of the strips. Preferably in embodiments where the strips are lightweight construction the fingers may also be configured to provide a downward force on the strips.

The speed of the second conveyor should be sufficiently fast relative to the speed of the first conveyor to directly or indirectly cause the strips to tip over.

The claims defining the invention are:

1. A conveyor system for re-orienting strips of laminated corrugated board, comprising:
   a first conveyor assembly; and
   a second conveyor assembly adjacent to the first conveyor assembly,
   wherein the first conveyor assembly conveys a plurality of strips having an upright orientation to the second conveyor assembly, the first and second conveyor assemblies being located in the plane;
   wherein the conveyor system also includes a speed retarding element which decreases the speed of the top of a strip as the strip starts moving along the second conveyor assembly;
   wherein the second conveyor assembly includes a conveyor belt configured to convey the plurality of strips at a faster speed to that at which the strips are delivered to the second conveyor assembly by the first conveyor assembly; and
   wherein the acceleration of each strip upon contacting the second conveyor assembly together with the action of the retarding element causes that strip to tip over from the upright orientation to a flat orientation.

2. The conveyor system for re-orienting strips of laminated corrugated board as claimed in claim 1 wherein the first conveyor includes a conveyor belt.

3. The conveyor system for re-orienting strips of laminated corrugated board as claimed in claim 1 wherein the first conveyor includes a pusher bar.

4. The conveyor system for re-orienting strips of laminated corrugated board as claimed in claim 1 wherein the first conveyor includes both a conveyor belt and a pusher bar.

5. The conveyor system for re-orienting strips of laminated corrugated board as claimed in claim 1 wherein the speed of the second conveyor assembly is faster than the speed of the first conveyor assembly so as to directly or indirectly cause the strips to tip over.

6. The conveyor system for re-orienting strips of laminated corrugated board as claimed in claim 1 wherein the speed retarding element includes an axle and two wheels located at respect end portions of the axle.

7. The conveyor system for re-orienting strips of laminated corrugated board as claimed in claim 6 wherein the wheels are in the form of gear wheels.

8. The conveyor system for re-orienting strips of laminated corrugated board as claimed in claim 7 wherein the wheels are gear wheels having a thickness of substantially 0.15 mm.

9. The conveyor system for re-orienting strips of laminated corrugated board as claimed in claim 1 wherein the speed retarding element is in the form of at least one directed jet of fluid.

10. The conveyor system for re-orienting strips of laminated corrugated board as claimed in claim 1 wherein the speed retarding element is in the form of at least one resilient finger which restricts the path of the top portion of the strips.

11. The conveyor system for re-orienting strips of laminated corrugated board as claimed in claim 9 wherein the fluid is air.

* * * * *